(12) United States Patent
Choi

(10) Patent No.: US 12,488,845 B2
(45) Date of Patent: Dec. 2, 2025

(54) APPARATUS AND METHOD FOR PROGRAMMING AND VERIFYING DATA IN NON-VOLATILE MEMORY DEVICE

(71) Applicant: SK hynix Inc., Gyeonggi-do (KR)

(72) Inventor: Hyung Jin Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 322 days.

(21) Appl. No.: 18/295,855

(22) Filed: Apr. 5, 2023

(65) Prior Publication Data

US 2024/0170077 A1    May 23, 2024

(30) Foreign Application Priority Data

Nov. 23, 2022   (KR) .................. 10-2022-0158278

(51) Int. Cl.
*G11C 16/04*   (2006.01)
*G11C 16/10*   (2006.01)
*G11C 16/34*   (2006.01)
*G11C 29/52*   (2006.01)

(52) U.S. Cl.
CPC ........ *G11C 16/3459* (2013.01); *G11C 16/102* (2013.01); *G11C 29/52* (2013.01)

(58) Field of Classification Search
CPC .... G11C 16/3459; G11C 16/102; G11C 29/52
See application file for complete search history.

(56) References Cited

U.S. PATENT DOCUMENTS

| 7,742,334 B2 | 6/2010 | Fujisawa et al. |
| 11,955,184 B2 * | 4/2024 | Guo .................... G11C 16/3459 |
| 11,996,137 B2 * | 5/2024 | Chang ................. G11C 11/4094 |
| 2004/0136245 A1 * | 7/2004 | Makamura ......... G11C 16/3445 |
| | | 365/185.01 |

FOREIGN PATENT DOCUMENTS

KR    10-2013-0038527 A    4/2013

* cited by examiner

*Primary Examiner* — Pho M Luu
(74) *Attorney, Agent, or Firm* — IP & T GROUP LLP

(57) ABSTRACT

A memory device comprises: a memory cell array including multiple cells have program states divided on a basis of N threshold voltage levels, and a controller configured to: divide, into N groups corresponding to the N threshold voltage levels, cells selected as a verification target, and perform, if a selected group of the N groups corresponds to remaining threshold voltage levels except a highest threshold voltage level among the N threshold voltage levels, a pass masking operation of determining the selected group to have a program pass state when a number of cells checked to have a program fail state in the selected group is less than a reference number in a verification interval included in a program operation, wherein the controller is configured not to perform, if the selected group corresponds to the highest threshold voltage level, the pass masking operation on the selected group in the verification interval.

18 Claims, 7 Drawing Sheets

APPARATUS AND METHOD FOR PROGRAMMING AND VERIFYING DATA IN NON-VOLATILE MEMORY DEVICE

CROSS-REFERENCE TO RELATED APPLICATION

This application claims priority under 35 U.S.C. § 119 to Korean Patent Application No. 10-2022-0158278 filed on Nov. 23, 2022, which is incorporated herein by reference in its entirety.

BACKGROUND

1. Field

Various embodiments of the present disclosure relate to a memory device, and particularly, to an apparatus and method for programming and verifying data in a nonvolatile memory device.

2. Discussion of the Related Art

Memory systems are storage devices embodied using a semiconductor such as silicon (Si), germanium (Ge), gallium arsenide (GaAs), indium phosphide (InP), or the like. The memory systems are classified into a volatile memory device and a nonvolatile memory device. The volatile memory device is a memory device in which data stored therein is lost when power supply is interrupted. Representative examples of the volatile memory device include static RAM (SRAM), dynamic RAM (DRAM), synchronous DRAM (SDRAM), etc. The nonvolatile memory device is a memory device in which data stored therein is retained even when power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc.

A cell of a nonvolatile memory device is an element on which an electrical program/erase operation may be performed. The nonvolatile memory device may perform program and erase operations on the cell by changing the threshold voltage of the cell as electrons are moved by a strong electric field applied to a thin oxide film of the cell.

A program operation for the multiple memory cells that are included in a nonvolatile memory device may be performed by an incremental step pulse program (ISPP) algorithm for changing the threshold voltages of memory cells selected as a program target, while applying a program pulse, having a voltage increased step by step, to a word line to which the memory cells selected as the program target have been connected. Furthermore, after the program pulse is applied, a verification operation of checking whether threshold voltage levels of the memory cells selected as the program target have reached a target voltage level, may be performed.

SUMMARY

Various embodiments of the present disclosure are directed to a memory device capable of selectively performing a pass bit masking operation in a program verification operation and an operating method thereof.

The problems to be solved by the present disclosure are not limited to the above-mentioned problems, and other unmentioned problems will be clearly understood from the following description by those skilled in the art.

In an embodiment of the present disclosure, a memory device may include: a memory cell array including multiple memory cells connected between multiple word lines and multiple bit lines and have program states divided on a basis of N threshold voltage levels; and a controller configured to: divide, into N groups corresponding to the N threshold voltage levels, cells selected as a verification target, and perform, if a selected group of the N groups corresponds to remaining threshold voltage levels except a highest threshold voltage level among the N threshold voltage levels, a pass masking operation of determining the selected group to have a program pass state when a number of cells checked to have a program fail state in the selected group is less than a reference number in a verification interval included in a program operation. The controller may be configured not to perform, if the selected group corresponds to the highest threshold voltage level, the pass masking operation on the selected group in the verification interval.

In an embodiment of the present disclosure, an operating method of a memory device, may include: an operation of repeatedly performing, until a program operation succeeds, a program loop on a memory cell selected as a program target among multiple memory cells connected between multiple word lines and multiple bit lines, the program loop including a program voltage application interval and a verification interval; a first check operation of dividing the cells selected as a verification target into N groups corresponding to N threshold voltage levels and checking, in the verification interval, whether a selected group of the N groups corresponds to remaining threshold voltage levels except a highest threshold voltage level among the N threshold voltage levels; a second check operation of checking a number of cells checked to have a program fail state among the cells in the selected group is less than a reference number; a first determination operation of performing a pass masking operation of determining the selected group to have a program pass state, when the selected group corresponds to the remaining groups in the first check operation and the number of cells checked to have the program fail state is less than the reference number in the second check operation; and a second determination operation of determining the program operation to be a success without performing the pass masking operation when the selected group corresponds to the highest threshold voltage level in the first check operation and the number of cells checked to have the program fail state is less than the reference number in the second check operation.

In an embodiment of the present disclosure, a memory device may include: a row of memory cells; and a control circuit configured to perform a program operation on the row by verifying the program operation on partial memory cells in the row according to a pass masking scheme and on remaining memory cells in the row without the pass masking scheme.

In accordance with an embodiment of the present disclosure, in a program verification operation for a memory device, a pass bit masking operation may be selectively applied based on a target threshold voltage level of a memory cell that has been selected as a verification target.

Accordingly, the time taken to apply the pass bit masking operation can be minimized.

DETAILED DESCRIPTION

Figure 1:
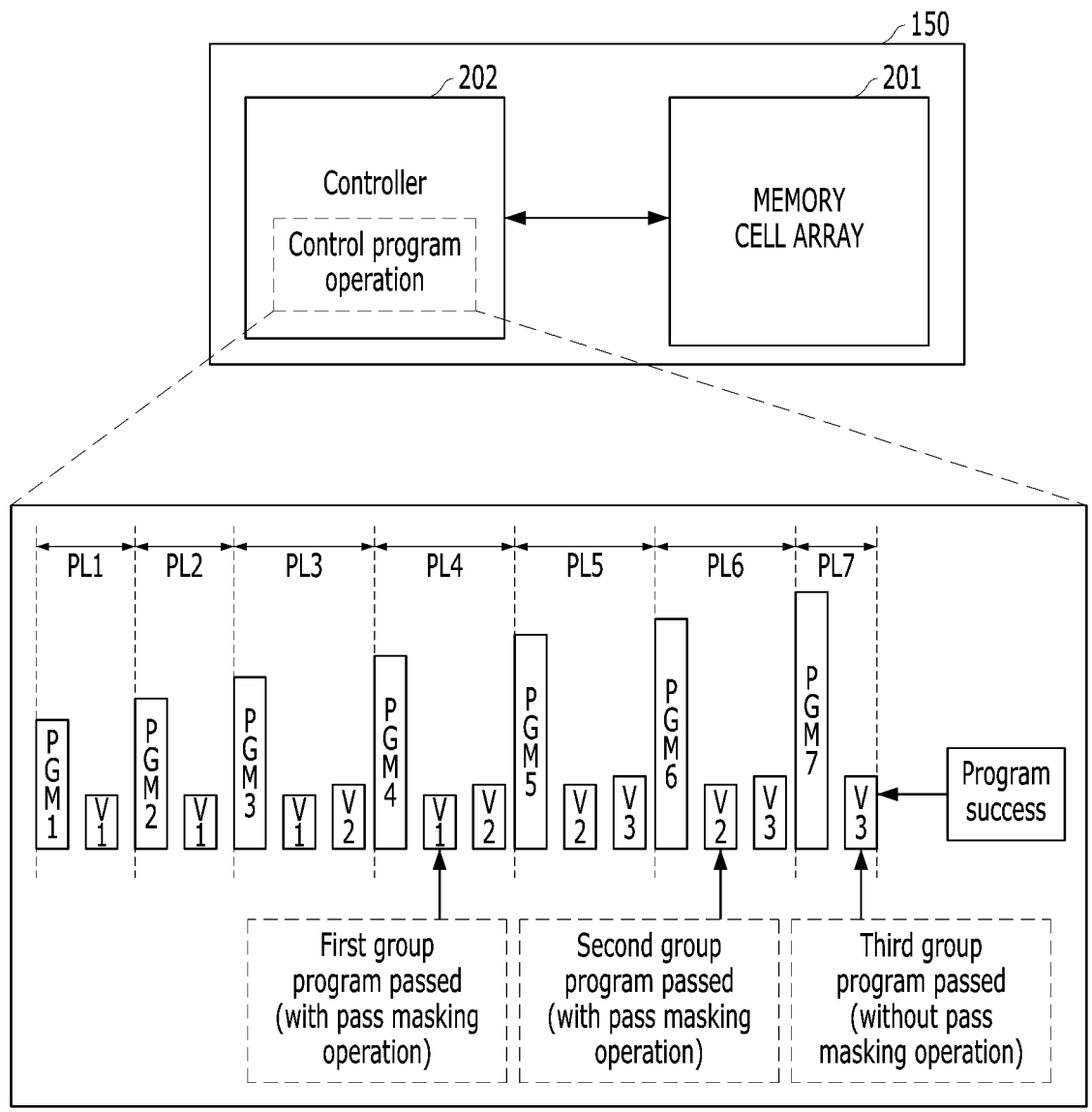
FIG. 1 is a diagram for describing a method of controlling a program operation, by a memory device according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware, for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

FIG. 1 is a diagram for describing a method of controlling a program operation, by a memory device according to an embodiment of the present disclosure.

Referring to FIG. 1, a memory device 150 according to an embodiment of the present disclosure may include a memory cell array 201 and a controller 202.

In this case, the memory device 150 may include multiple memory cells (not illustrated) connected between multiple word lines (not illustrated) and multiple bit lines (not illustrated). The program state of each of the multiple memory cells in the memory device 150 may be divided on the basis of N threshold voltage levels. N may be a natural number equal to or greater than 1.

In an embodiment, the memory cells included in the memory cell array 201 may be configured as single level cells (SLCs) each storing 1-bit data, multi-level cells (MLCs) each storing 2-bit data, triple level cells (TLCs) each storing 3-bit data or quad level cells (QLCs) each storing 4-bit data.

In an embodiment, the program state of a single level cell (SLC) in which one data bit is stored may be divided into two program states on the basis of one threshold voltage level. The program state of a multi-level cell (MLC) in which two data bits are stored may be divided into four program states on the basis of three threshold voltage levels. The program state of a triple level cell (TLC) in which three data bits are stored may be divided into eight program states on the basis of seven threshold voltage levels. The program state of a quad level cell (QLC) in which four data bits are stored may be divided into sixteen program states on the basis of fifteen threshold voltage levels. Hereinafter, each of the multiple memory cells in the memory cell array 201 is a multi-level cell, for convenience of description. Accordingly, N is 3.

Furthermore, the controller 202 may perform a program operation, a read operation, or an erase operation on a selected region of the memory cell array 201. The program operation may include multiple program loops PL1 to PL7. That is, the controller 202 may program a memory cell selected as a program target so that the memory cell has one of multiple program states by repeatedly performing the multiple program loops PL1 to PL7 one by one in a set order until the program operation is completed.

Each of the multiple program loops PL1 to PL7 may include a program voltage application interval in which program voltages PGM1 to PGM7 are applied and a verification interval in which whether a memory cell has been programmed by applying three verification voltages V1, V2, and V3 having three threshold voltage levels is determined.

In the program voltage application interval, the program voltages PGM1 to PGM7 may be applied to a selected word line connected to a memory cell selected as a program target. Accordingly, the selected memory cell may be programmed to have one of multiple program states.

In an embodiment, the potential level of a program voltage may be increased whenever each of the multiple program loops PL1 to PL7 is performed in a program operation. That is, in the program operation, as each of the multiple program loops PL1 to PL7 is repeatedly performed according to an incremental step pulse program (ISPP) method, the level of a program voltage may be increased step by step by a predetermined voltage increment. The number of program voltages applied, a voltage level of the program voltage, and a voltage application time of the program voltage that are used in each of the multiple program loops PL1 to PL7 may be determined in various forms.

In the program voltage application interval, a program voltage may be applied to a word line selected as a program target among the multiple word lines in the memory cell array 201. A pass voltage may be applied to a word line that has not been selected as the program target.

In the program voltage application interval, a program permission voltage may be applied to a selected bit line connected to a memory cell selected as a program target. A program inhibition voltage may be applied to an unselected bit line connected to a memory cell other than the memory cell selected as the program target. In an embodiment, the program permission voltage may be a ground voltage VSS, and the program inhibition voltage may be a source voltage VCORE.

Whenever each of the multiple program loops PL1 to PL7 is performed, a bit line precharge operation of precharging each of multiple bit lines BL1 to BLm connected to the multiple memory cells at a set potential level, for example, a program permission potential level or a program inhibition potential level may be performed.

In the verification interval, a verification voltage may be applied to a word line selected as a verification target, and a verification pass voltage may be applied to a word line that has not been selected as the verification target. In the verification interval, a voltage or a current output through a bit line to which each of memory cells that have been connected to the word line selected as the verification target has been connected, may be detected. Each of the memory cells may be determined as a program pass or fail state based on the results of the detection.

In the verification interval, a program verification operation for at least one of multiple program states may be performed. For example, if the program state of each of the multiple memory cells is divided into four program states on the basis of three threshold voltage levels, cells selected as a verification target among the multiple memory cells may be divided into three cell groups corresponding to the three threshold voltage levels. As another example, if the program state of each of the multiple memory cells is divided into eight program states on the basis of seven threshold voltage levels, cells selected as a verification target among the multiple memory cells may be divided into seven cell groups corresponding to the seven threshold voltage levels.

If the cells selected as the verification target are divided into the three cell groups corresponding to the three threshold voltage levels, in the verification interval, the three verification voltages V1, V2, and V3 having the three threshold voltage levels may be used for each of the three cell groups. For example, in the verification interval, each of the cells in a first cell group may be determined as the program pass or fail state through an operation of comparing the threshold voltage level of each cell with the level of the first verification voltage V1. In this case, an operation of comparing the threshold voltage levels of the cells in the first cell group with the levels of the second verification voltage V2 and the third verification voltage V3 may not be performed. Likewise, in the verification interval, each of cells in a second cell group may be determined as the program pass or fail state through an operation of comparing the threshold voltage level of each cell with the level of the second verification voltage V2. In this case, an operation of comparing the threshold voltage levels of the cells in the second cell group with the levels of the first verification voltage V1 and the third verification voltage V3 may not be performed on the cells. Furthermore, in the verification interval, each of cells in a third cell group may be determined as the program pass or fail state through an operation of comparing the threshold voltage level of each cell with the level of the third verification voltage V3. In this case, an operation of comparing the threshold voltage levels of the cells in the third cell group with the levels of the first verification voltage V1 and the second verification voltage V2 may not be performed on the cells.

In each of the three cell groups, a memory cell that has been determined as the program pass state based on each of the three verification voltages V1, V2, and V3 may be determined as having a target program state. Accordingly, in a subsequent program loop, the state of the memory cell may be changed into a program inhibition state. A program inhibition voltage may be applied to a bit line connected to a memory cell on which a program has been inhibited.

As in some program loops PL1, PL2, and PL7 of the multiple program loops PL1 to PL7, only one verification voltage V1 or V3 may be used in the verification interval. For example, when the first program loop PL1 is performed, after the first program voltage PGM1 is applied, verification may be performed on the cells in the first cell group having a first threshold voltage level set as a target threshold voltage level by using the first verification voltage V1. Furthermore, when the seventh program loop PL7 is performed, after the seventh program voltage PGM7 is applied, verification may be performed on the cells in the third cell group having a third threshold voltage level set as a target threshold voltage level by using the third verification voltage V3.

Furthermore, as in some program loops PL3, PL4, PL5, and PL6 of the multiple program loops PL1 to PL7, in the verification interval, at least two verification voltages V1 and V2 or V2 and V3 may be used. In this case, a verification operation of applying each of the at least two verification voltages V1 and V2 or V2 and V3 may be sequentially performed at least two times in one verification interval. For example, when the third program loop PL3 is performed, after the third program voltage PGM3 is applied, the first verification voltage V1 and the second verification voltage V2 may be sequentially applied. Accordingly, first, verification may be performed on the cells in the first cell group having the first threshold voltage level set as a target threshold voltage level by using the first verification voltage V1. Next, verification may be performed on the cells in the second cell group having a second threshold voltage level set as a target threshold voltage level by using the second verification voltage V2. Furthermore, when the sixth program loop PL6 is performed, after the sixth program voltage PGM6 is applied, the second verification voltage V2 and the third verification voltage V3 may be sequentially applied. Accordingly, first, verification may be performed on the cells in the second cell group having the second threshold voltage level set as the target threshold voltage level by using the second verification voltage V2. Next, verification may be performed on the cells in the third cell group having the third threshold voltage level set as a target threshold voltage level by using the third verification voltage V3.

The controller 202 according to an embodiment of the present disclosure may select whether to perform a pass masking operation on a selected cell group depending on whether a cell group selected as a verification target corresponds to the highest threshold voltage level in a verification interval.

For example, if cells selected as a verification target are divided into three cell groups corresponding to three threshold voltage levels in a verification interval, a pass masking operation may not be performed on one cell group corresponding to the highest threshold voltage level of the three threshold voltage levels. The pass masking operation may be performed on the two cell groups corresponding to the remaining threshold voltage levels of the three threshold voltage levels except the highest threshold voltage level.

In this case, the pass masking operation may be an operation of determining all cells in a selected group as the program pass state when the number of cells checked to have a program fail state among the cells in the cell group selected as a verification target is less than a reference number. That is, the pass masking operation may be an operation of setting, as a program inhibition potential level, the potential level of each of bit lines connected to all of the cells in the selected group when the number of cells checked to have the program fail state among the cells in the cell group selected as the verification target is less than the reference number. Accordingly, when the pass masking operation may be performed on the selected cell group, the threshold voltage levels of all of the cells in the selected cell group may not be changed in a subsequent program loop.

In this case, the reference number may mean a number of correctable errors in the selected group. That is, although not materialized in the drawing, the controller 202 may include an error correction code (ECC). The number of cells having the program fail state to the extent to which a correction is possible through the ECC in a selected group may be defined as the "reference number". Accordingly, if the number of cells having a fail state among the cells in the selected group is the reference number or more, this may mean the state in which the cells having the fail state cannot be corrected through the ECC. In contrast, if the number of cells having the fail state among the cells in the selected group is less than the reference number, this may mean the state in which the cells having the fail state may be corrected through the ECC. In an embodiment, a value of the reference number may be adjusted based on performance of an ECC included in the controller 202. In an embodiment, a value of the reference number may be adjusted based on the number of cells in a selected group.

Furthermore, the controller 202 may use the following two methods in order to determine whether cells having the program fail state in a selected group is less than the reference number.

First, the controller 202 may use a method of checking whether each of the cells in a selected group has the program pass/fail state by checking whether the threshold voltage level of each of the cells in the selected group is a target voltage level, counting the number of cells checked to have the program fail state, and comparing the counted number and the reference number.

Second, the controller 202 may use a method of checking whether each of the cells in a selected group has the program pass/fail state by checking whether the threshold voltage level of each of the cells in the selected group is a target voltage level, and comparing the amount of current according to the number of cells checked to have the program fail state and a reference current corresponding to the reference number.

In an embodiment, when the threshold voltages of the cells in the first cell group having the first threshold voltage level or the lowest level set as a target threshold voltage level among three groups is checked to be less than the first threshold voltage level in a verification interval, the cells may be divided as the program fail state. In this case, when the number of cells that has been classified as the program fail state among the cells in the first cell group is less than the reference number, a pass masking operation may be performed on the first cell group by determining, as the program pass state, all of the cells in the first cell group. That is, when the number of cells in the program fail state among the cells in the first cell group is less than the reference number, all of the potential levels of bit lines connected to the cells in the first cell group may be set as a program inhibition level. If the pass masking operation is performed on the first cell group as described above, the threshold voltage levels of all of the cells in the first cell group may not be changed in a subsequent program loop. In this drawing, it may be seen that in the fourth program loop PL4, a pass masking operation is performed on the first cell group. Accordingly, in the fifth to seventh program loops PL5, PL6, and PL7 subsequent to the fourth program loop PL4, the threshold voltage levels of all of the cells in the first cell group may not be changed.

When the number of cells in the program fail state among the cells in the first cell group is the reference number or more, only the potential level of a bit line connected to a cell in the program pass state may be set as the program inhibition level, the potential level of a bit line connected to a cell in the program fail state may be set as a program permission level. In this drawing, the first to third program voltages PGM1, PGM2, and PGM3 have been sequentially applied to the cells in the first cell group in the first to third program loops PL1, PL2, and PL3, but the number of cells in the program fail state among the cells in the first cell group may be the reference number or more. Accordingly, in the verification intervals in the first to third program loops PL1, PL2, and PL3, a pass masking operation may not be performed on the first cell group.

In an embodiment, when it is checked that the threshold voltage levels of the cells in the second cell group having the second threshold voltage level or an intermediate level set as a target threshold voltage level among the three groups is less than the second threshold voltage level in the verification interval, the cells may be divided as the program fail state. In this case, when the number of cells in the program fail state among the cells in the second cell group is less than the reference number, a pass masking operation may be performed on the second cell group by determining all of the cells in the second cell group as the program pass state. That is, when the number of cells in the program fail state among the cells in the second cell group is less than the reference number, all of the potential levels of bit lines connected to the cells in the second cell group may be set as a program inhibition level. If the pass masking operation is performed on the second cell group as described above, in a subsequent program loop, the threshold voltage levels of all of the cells in the second cell group may not be changed. In this drawing, it may be seen that in the sixth program loop PL6, a pass masking operation is performed on the second cell group. Accordingly, in the subsequent seventh program loop PL7, the threshold voltage levels of all of the cells in the second cell group may not be changed.

When the number of cells in the program fail state among the cells in the second cell group is the reference number or more, only the potential level of a bit line connected to a cell in the program pass state may be set as a program inhibition level, and the potential level of a bit line connected to a cell in the program fail state may be set as a program permission level. In this drawing, the third to fifth program voltages PGM3, PGM4, and PGM5 have been sequentially applied to the cells in the second cell group in the third to fifth program loops PL3, PL4, and PL5, but the number of cells in the program fail state among the cells in the second cell group may be the reference number or more. Accordingly, in the verification intervals in the third to fifth program loops PL3, PL4, and PL5, a pass masking operation may not be performed on the second cell group.

In an embodiment, when the threshold voltage levels of the cells in the third cell group having the third threshold voltage level or the highest level set as a target threshold voltage level among the three groups, are checked to be less than the third threshold voltage level in the verification interval, the cells may be divided as the program fail state. In this case, when the number of cells in the program fail state among the cells in the third cell group is less than the reference number, a pass masking operation may not be performed on the third cell group, and a program operation may be determined to be a success. That is, when the number of cells in the program fail state among the cells in the third cell group is less than the reference number, an operation of setting the potential level of each of bit lines connected to the cells in the third cell group may not be performed, and the cells may be determined as a program success. In this drawing, it may be seen that in the seventh program loop PL7, the number of cells in the program fail state among the cells in the third cell group is less than the reference number. Accordingly, it may be seen that a pass masking operation is not performed on the third cell group and the program operation is determined to be a success.

When the number of cells in the program fail state among the cells in the third cell group is the reference number or more, only the potential level of a bit line connected to a cell in the program pass state may be set as a program inhibition level, and the potential level of a bit line connected to a cell in the program fail state may be set as a program permission level. In this drawing, the fifth and sixth program voltages PGM5 and PGM6 have been sequentially applied to the cells in the third cell group in the fifth and sixth program loops PL5 and PL6, but the number of cells in the program fail state among the cells in the third cell group may be the reference number or more.

When a program operation is not successful within the preset number of program loops, the program operation may be determined to be a fail. In this drawing, it may be seen that the program operation is a success after the seven program loops PL1 to PL7 are repeated.

Figure 2A:
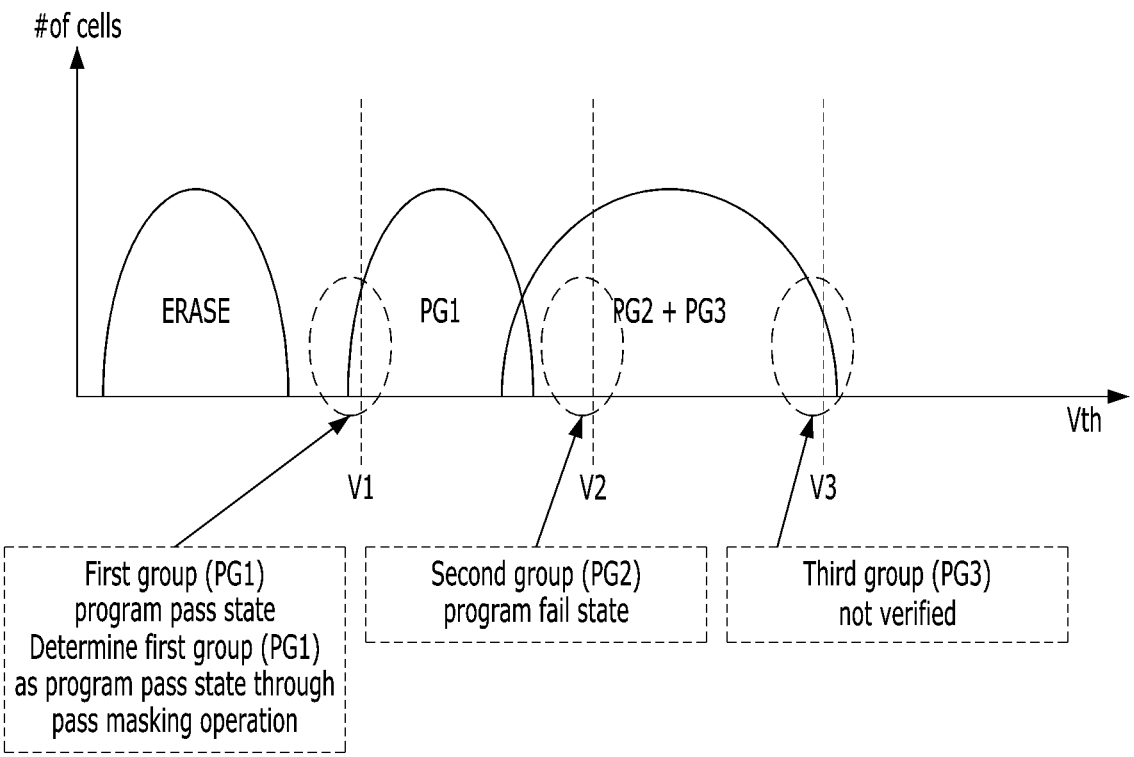
FIGS. 2A to 2C are diagrams for describing processes of distributions of cells being changed based on control of program operations by the memory device according to an embodiment of the present disclosure.
Figure 2B:
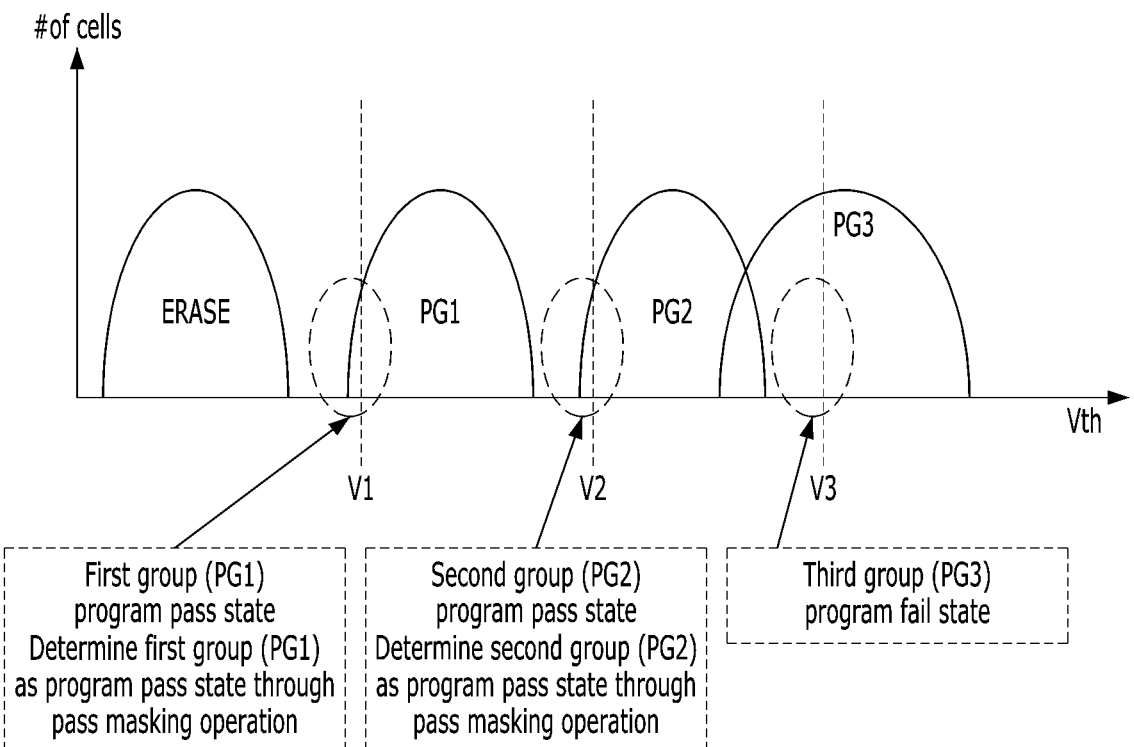
Figure 2C:
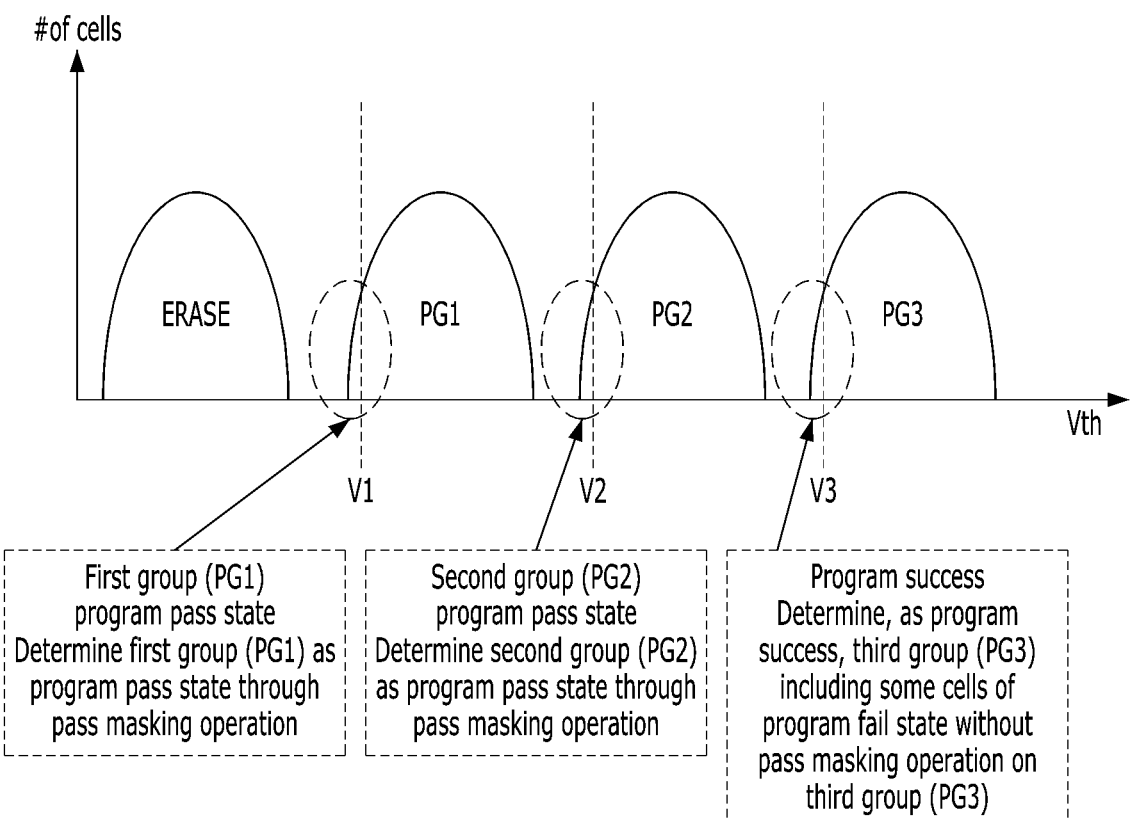

FIGS. 2A to 2C are diagrams for describing processes of distributions of cells being changed based on control of program operations by the memory device according to an embodiment of the present disclosure.

Referring to FIG. 2A along with FIG. 1, it may be seen that a distribution of cells illustrated in FIG. 2A is a distribution of cells corresponding to the fourth program loop PL4 among the multiple program loops PL1 to PL7 in the program operation.

Specifically, it may be seen that after the fourth program voltage PGM4 included in the fourth program loop PL4 is applied, a verification operation using the first verification voltage V1 is performed on the cells in the first cell group having the first threshold voltage level or the lowest level set as a target threshold voltage level among the three groups. As described above, as a result of the execution of the verification operation using the first verification voltage V1 for the cells in the first cell group, the number of cells in the program fail state may become less than the reference number. Accordingly, in the distribution of the cells illustrated in FIG. 2A, it may be seen that all of the cells in the first cell group are treated as a program pass state through a pass masking operation of setting, as a program inhibition level, all of the potential levels of bit lines connected to the cells in the first cell group.

Furthermore, it may be seen that after the fourth program voltage PGM4 included in the fourth program loop PL4 is applied, a verification operation using the second verification voltage V2 is performed on the cells in the second cell group having the second threshold voltage level or an intermediate level set as a target threshold voltage level among the three groups. As described above, as a result of the execution of the verification operation using the second verification voltage V2 for the cells in the second cell group, the number of cells in the program fail state may become the reference number or more. That is, the second cell group may have the program fail state. Accordingly, in the distribution of the cells illustrated in FIG. 2A, only the potential level of a bit line connected to a cell in the program pass state among the cells in the second cell group may be set as a program inhibition level, and the potential level of a bit line connected to a cell in the program fail state among the cells in the second cell group may be set as a program permission level.

Furthermore, it may be seen that after the fourth program voltage PGM4 included in the fourth program loop PL4 is applied, a verification operation is not performed on the cells in the third cell group having the third threshold voltage level or the highest level set as a target threshold voltage level among the three groups. Accordingly, in the distribution of the cells illustrated in FIG. 2A, the cells in the second cell group and the cells in the third cell group may not be clearly divided.

Referring to FIG. 2B along with FIG. 1, it may be seen that a distribution of cells illustrated in FIG. 2B is a distribution of cells corresponding to the sixth program loop PL6 among the multiple program loops PL1 to PL7 in the program operation.

Specifically, it may be seen that after the sixth program voltage PGM6 included in the sixth program loop PL6 is applied, a verification operation is not performed on the cells in the first cell group having the first threshold voltage level or the lowest level set as a target threshold voltage level among the three groups. The reason for this is that in the previous fourth program loop PL4, a pass masking operation has been performed on the first cell group. That is, in the fifth and sixth program loops PL5 and PL6 that have been performed after the fourth program loop PL4, a change in the threshold voltage levels of the cells in the first cell group may no longer occur. Accordingly, in the fifth and sixth program loops PL5 and PL6 that have been performed after the fourth program loop PL4, it is not necessary to perform a verification operation on the first cell group. Accordingly, it may be seen that in the distribution of the cells illustrated in FIG. 2B, a distribution of the cells in the first cell group maintains a distribution of cells that has been determined after the pass masking operation is performed, without any change.

Furthermore, it may be seen that after the sixth program voltage PGM6 included in the sixth program loop PL6 is applied, a verification operation using the second verification voltage V2 is performed on the cells in the second cell group having the second threshold voltage level or an intermediate level set as a target threshold voltage level among the three groups. As described above, as a result of the execution of the verification operation using the second verification voltage V2 for the cells in the second cell group, the number of cells in the program fail state may become less than the reference number. Accordingly, it may be seen that in the distribution of the cells illustrated in FIG. 2B, all of the cells in the second cell group are treated as the program pass state through a pass masking operation of setting, as a program inhibition level, all of the potential levels of bit lines connected to the cells in the second cell group.

Furthermore, it may be seen that after the sixth program voltage PGM6 included in the sixth program loop PL6 is applied, a verification operation using the third verification voltage V3 is performed on the cells in the third cell group having the third threshold voltage level or the highest level set as a target threshold voltage level among the three groups. As described above, as a result of the execution of the verification operation using the third verification voltage V3 for the cells in the third cell group, the number of cells in the program fail state may become the reference number or more. That is, the third cell group may have the program fail state. Accordingly, in the distribution of the cells illustrated in FIG. 2B, only the potential level of a bit line connected to a cell in the program pass state among the cells in the third cell group may be set as a program inhibition level, and the potential level of a bit line connected to a cell in the program fail state among the cells in the third cell group may be set as a program permission level.

Referring to FIG. 2C along with FIG. 1, it may be seen that a distribution of cells illustrated in FIG. 2C is a distribution of cells corresponding to the seventh program loop PL7 among the multiple program loops PL1 to PL7 in the program operation.

Specifically, it may be seen that after the seventh program voltage PGM7 included in the seventh program loop PL7 is applied, a verification operation is not performed on the cells in the first cell group and the cells in the second cell group, which have the first threshold voltage level or the lowest level set as a target threshold voltage level among the three groups. The reason for this is that a pass masking operation has been performed on the first cell group in the previous fourth program loop PL4 and a pass masking operation has been performed on the second cell group in the previous sixth program loop PL6. That is, in the fifth and sixth program loops PL5 and PL6 that have been performed after the fourth program loop PL4, a change in the threshold voltage levels of the cells in the first cell group may no longer occur. Accordingly, in the fifth and sixth program loops PL5 and PL6 that have been performed after the fourth program loop PL4, it is not necessary to perform a verification operation on the first cell group. Furthermore, in the seventh program loop PL7 that has been performed after the sixth program loop PL6, a change in the threshold voltage levels of the cells in the second cell group may no longer occur. Accordingly, in the seventh program loop PL7 that has been performed after the sixth program loop PL6, it is not necessary to perform a verification operation on the second cell group. Accordingly, it may be seen that in the distribution of the cells illustrated in FIG. 2C, distributions of the cells in the first cell group and the cells in the second cell group maintain distributions of cells that have been determined after the pass masking operations are performed, without any change.

Furthermore, it may be seen that after the seventh program voltage PGM7 included in the seventh program loop PL7 is applied, a verification operation using the third verification voltage V3 is performed on the cells in the third cell group having the third threshold voltage level or the highest level set as a target threshold voltage level among the three groups. As a result of the execution of the verification operation using the third verification voltage V3 for the cells in the third cell group as described above, the number of cells in the program fail state may become less than the reference number. Accordingly, a pass masking operation may not be performed on the third cell group, and a program operation may be determined to be a success. That is, when the number of cells in the program fail state among the cells in the third cell group is less than the reference number, an operation of setting the potential levels of bit lines connected to the cells in the third cell group may not be performed, and the cells may be treated as a program success.

Figure 3:
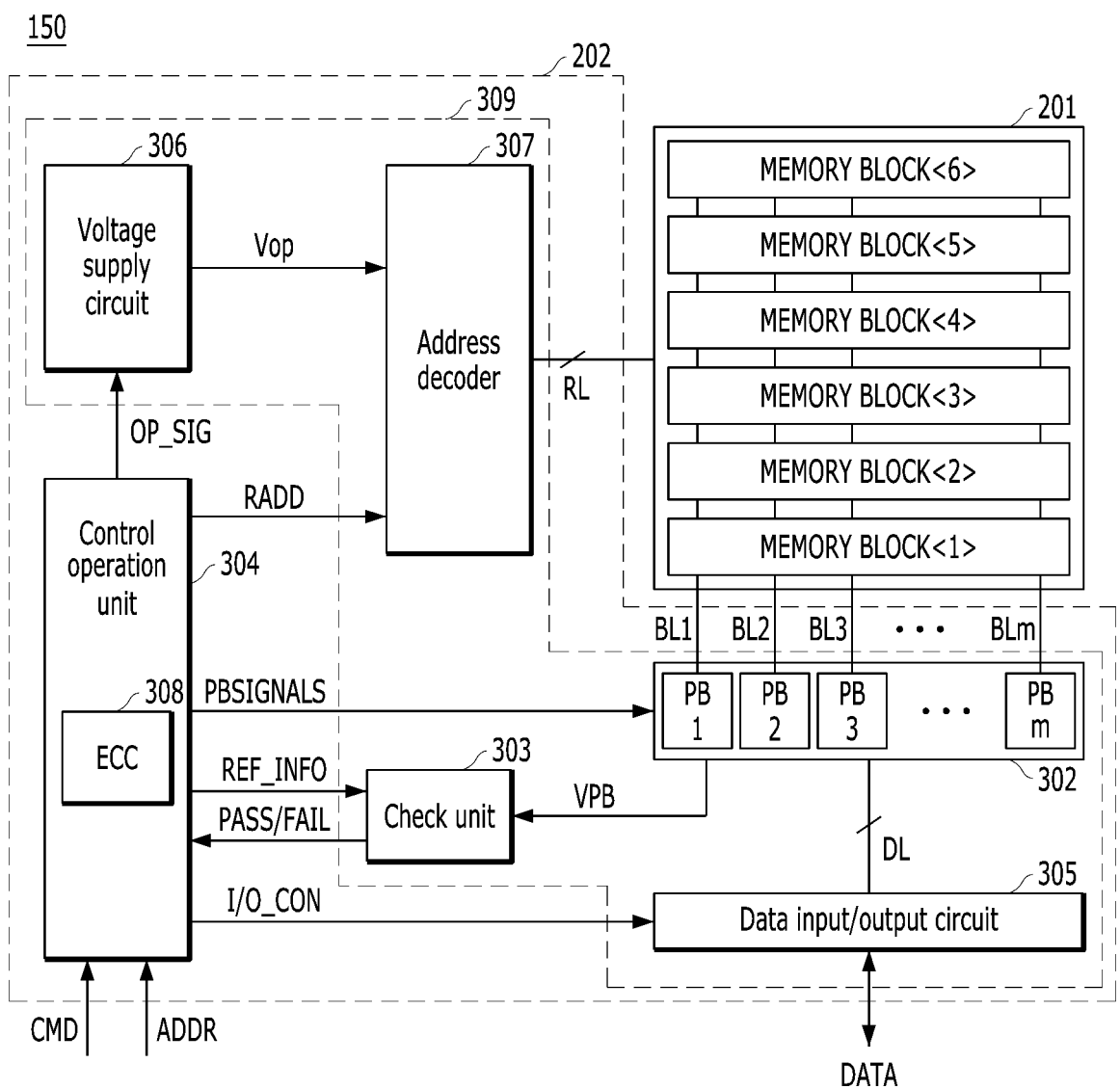
FIG. 3 is a diagram for describing a detailed construction of the memory device according to an embodiment of the present disclosure.

FIG. 3 is a diagram for describing a detailed construction of the memory device according to an embodiment of the present disclosure.

Referring to FIG. 3, the memory device 150 may include the memory cell array 201 and the controller 202. The controller 202 may include a control circuit unit 309 and a control operation unit 304. Furthermore, the control circuit unit 309 may include a page buffer unit 302, a check unit 303, a data input/output circuit 305, a voltage supply circuit 306, and an address decoder 307. Furthermore, the control operation unit 304 may include an ECC 308.

The memory cell array 201 may include a plurality of memory blocks MEMORY BLOCK<1:6>. The plurality of memory blocks MEMORY BLOCK<1:6> may be connected to an address decoder 307 through a row line RL. The plurality of memory blocks MEMORY BLOCK<1:6> may be connected to the page buffer unit 302 through bit lines BL1 to BLm. Each of the memory blocks MEMORY BLOCK<1:6> may include a plurality of memory cells. In an embodiment, the plurality of memory cells may be nonvolatile memory cells. Memory cells connected to the same word line may be defined as one page. Accordingly, one memory block may include a plurality of pages.

The row line RL may include at least one source selection line, a plurality of word lines and at least one drain selection line.

The control circuit unit 309 may be configured to perform a program, read or erase operation on a selected region of the memory cell array 201. The control circuit unit 309 may drive the memory cell array 201. For example, the control circuit unit 309 may apply various operating voltages to the row line RL and the bit lines BL1 to BLm, or discharge the applied voltages.

The address decoder 307 among the control circuit unit 309 may be connected to the memory cell array 201 through the row line RL. The row line RL may include the drain selection line, the word lines, the source selection line and a common source line.

The address decoder 307 may be configured to operate in response to the control of the control operation unit 304. The address decoder 307 may receive an address RADD from the control operation unit 304.

The address decoder 307 may be configured to decode a block address of the received address RADD. The address decoder 307 may select at least one memory block among the memory blocks MEMORY BLOCK<1:6> according to the decoded block address. The address decoder 307 may be configured to decode a row address of the received address RADD. The address decoder 307 may select at least one word line among word lines of the selected memory block according to the decoded row address. The address decoder 307 may apply operating voltages Vop, which are supplied from the voltage supply circuit 306, to the selected word line.

The program operation of the memory device 150 may be performed in units of pages. During the program operation, the address decoder 307 may apply a program voltage to the selected word line, and apply a pass voltage having a lower level than the program voltage to an unselected word line. During a program verification operation, the address decoder 307 may apply a verification voltage V1, V2, V3 (refer to FIG. 1) to the selected word line, and apply a verification pass voltage having a higher level than the verification voltage to the unselected word line.

The read operation of memory device 150 may be performed in units of pages. During the read operation, the address decoder 307 may apply a read voltage to the selected word line, and apply a read pass voltage having a higher level than the read voltage to the unselected word line.

The erase operation of the memory device 150 may be performed in units of memory blocks. During the erase operation, an address ADDR inputted to the memory device 150 during the erase operation may include a block address. The address decoder 307 may decode the block address, and select at least one memory block according to the decoded block address. During the erase operation, the address decoder 307 may apply a ground voltage to a word line of the selected memory block.

The voltage supply circuit 306 among the control circuit unit 309 may be configured to generate a plurality of operating voltages Vop by using an external power supply voltage. The voltage supply circuit 306 may operate in response to the control of the control operation unit 304.

In an embodiment, the voltage supply circuit 306 may regulate the external power supply voltage, and generate an internal power supply voltage.

In an embodiment, the voltage supply circuit 306 may generate the plurality of operating voltages Vop by using the external power supply voltage or the internal power supply voltage. For example, the voltage supply circuit 306 may generate a plurality of erase voltages, a plurality of program voltages, a plurality of pass voltages, a plurality of selective read voltages and a plurality of unselective read voltages.

The voltage supply circuit 306 may include a plurality of pumping capacitors, which receive the internal power supply voltage, to generate the plurality of operating voltages Vop having various voltage levels, and generate the plurality of operating voltages Vop by selectively activating the plurality of pumping capacitors in response to the control of the control operation unit 304.

The generated operating voltages Vop may be supplied to the memory cell array 201 by the address decoder 307.

The page buffer unit 302 may include a plurality of page buffers PB1 to PBm. The plurality of page buffers PB1 to PBm may be connected to the memory cell array 201 through the plurality of bit lines BL1 to BLm, respectively. The plurality of page buffers PB1 to PBm may operate in response to the control of the control operation unit 304.

The plurality of page buffers PB1 to PBm may communicate data DATA with the data input/output circuit 305. During the program operation, the plurality of page buffers PB1 to PBm may receive the data DATA to be stored, through the data input/output circuit 305 and a data line DL.

In a program voltage application interval included in a program operation, when a program voltage is applied to a selected word line, multiple page buffers PB1 to PBm may transfer data DATA that has been received through the data input/output circuit 305 to a memory cell selected through bit lines BL1 to BLm. The memory cell of a selected page may be programmed based on the transferred data DATA. The threshold voltage of a memory cell connected to a bit line to which a program permission voltage (e.g., a ground voltage) is applied may rise. The threshold voltage of a memory cell connected to a bit line to which a program inhibition voltage (e.g., a power supply voltage) is applied may be maintained without any change. In a verification interval included in the program operation, the multiple page buffers PB1 to PBm may read, from the selected memory cell, the data DATA that has been stored in the selected memory cell through the bit lines BL1 to BLm. That is, in the verification interval, the multiple page buffers PB1 to PBm may adjust the potential levels of the bit lines BL1 to BLm based on a program state of the selected memory cell.

More specifically, as an example, selected memory cells are divided into four cell groups corresponding to three threshold voltage levels. A verification operation may not be performed on an erase cell group of the four cell groups. In a verification operation for the first cell group of the four cell groups, only a page buffer corresponding to the first cell group among the multiple page buffers PB1 to PBm may selectively operate. The potential level of a bit line connected to the cells in the first cell group may be adjusted based on a program state of the cells in the first cell group or two program states based on a first threshold voltage level. In a verification operation for the second cell group of the four cell groups, only a page buffer corresponding to the second cell group among the multiple page buffers PB1 to PBm may selectively operate. The potential level of a bit line connected to the cells in the second cell group may be adjusted based on a program state of the cells in the second cell group or two program states based on a second threshold voltage level. In a verification operation for the third cell group of the four cell groups, only a page buffer corresponding to the third cell group among the multiple page buffers PB1 to PBm may selectively operate. The potential level of a bit line connected to the cells in the third cell group may be adjusted based on a program state of the cells in the third cell group or two program states based on a third threshold voltage level.

During the read operation, the page buffer unit 302 may read the data DATA from the memory cell of the selected page through the bit lines BLs, and store the read data DATA in the plurality of page buffers PB1 to PBm.

During the erase operation, the page buffer unit 302 may float the bit lines BLs. In an embodiment, the page buffer unit 302 may include a column selection circuit.

The data input/output circuit 305 among the control circuit unit 309 may be connected to the plurality of page buffers PB1 to PBm through the data line DL. The data input/output circuit 305 may operate in response to the control of the control operation unit 304.

The data input/output circuit 305 may include a plurality of input/output buffers (not illustrated) that receive the data DATA inputted thereto. During the program operation, the data input/output circuit 305 may receive the data DATA to be stored from an external. The data input/output circuit 305 may output the data DATA, which is transmitted from the plurality of page buffers PB1 to PBm included in the page buffer unit 302, to the external during the read operation.

The check unit 303 of the control circuit unit 309 may use the following two methods in order to determine whether the number of bit lines, the potential levels of which have been adjusted to a potential level having the program fail state, is less than a reference number among bit lines selected by the page buffer unit 302, in a verification interval included in a read operation or a program operation.

First, the check unit 303 may use a method of checking whether each of the selected bit lines has a program pass/fail state based on the potential level of each of the selected bit lines, counting the number of bit lines checked to have the program fail state, and comparing the number of bit lines that has been counted with a reference number REF_INFO applied by the control operation unit 304. That is, when a counted value of the number of bit lines checked to have the program fail state is less than the reference number REF_INFO, the check unit 303 may generate a pass signal PASS and output the pass signal PASS to the control operation unit 304. In contrast, when the counted value of the number of bit lines checked to have the program fail state is greater than or equal to the reference number REF_INFO, the check unit 303 may generate a fail signal FAIL and output the fail signal FAIL to the control operation unit 304.

Second, the check unit 303 may use a method of checking whether each of the selected bit lines has the program pass/fail state based on the potential level of each of the selected bit lines and comparing the amount of current according to the number of bit lines checked to have the program fail state and a reference current corresponding to the reference number REF_INFO applied by the control operation unit 304. That is, when the amount of current according to the number of bit lines checked to have the program fail state is less than the reference current, the check unit 303 may generate the pass signal PASS and output the pass signal PASS to the control operation unit 304. In contrast, when the amount of current according to the number of bit lines checked to have the program fail state is greater than or equal to the reference current, the check unit 303 may generate the fail signal FAIL and output the fail signal FAIL to the control operation unit 304.

The control operation unit 304 may be connected to the address decoder 307, the voltage supply circuit 306, the page buffer unit 302, the data input/output circuit 305, and the check unit 303 in the control circuit unit 309. The control operation unit 304 may be configured to control an overall operation of the memory device 150. The control operation unit 304 may operate in response to a command CMD from an external device.

The control operation unit 304 may control the control circuit unit 309 by generating various signals in response to the command CMD and an address ADDR. For example, the control operation unit 304 may generate an operation signal OPSIG, an address RADD, a read and write control signal PBSIGNALS, and the reference number REF_INFO, in response to the command CMD and the address ADDR. The control operation unit 304 may output the operation signal OPSIG to the voltage supply circuit 306 may output the address RADD to the address decoder 307 may output the read and write control signal PBSIGNALS to the page buffer unit 302, and may output the reference number REF_INFO to the check unit 303. Furthermore, the control operation unit 304 may determine whether a verification operation has passed or failed in response to the pass or fail signal PASS/FAIL that is output by the check unit 303.

Furthermore, the control operation unit 304 may determine a value of the reference number REF_INFO through the ECC 308 included in the control operation unit 304. That is, the control operation unit 304 may determine a value of the reference number REF_INFO based on whether the number of bit lines having the program fail state among bit lines selected by the page buffer unit 302, corresponds to the extent to which the bit lines having the program fail state can be corrected through the ECC 308 in a verification interval included in a read operation or a program operation. For example, the control operation unit 304 may adjust a value of the reference number REF_INFO, which is determined based on performance of the ECC 308 included in the control operation unit 304. Furthermore, the control operation unit 304 may adjust a value of the reference number REF_INFO, which is determined based on the number of bit lines selected by the page buffer unit 302. For reference, the ECC 308 may perform an error correction by using coded modulation, such as a low density parity check (LDPC) code, a Bose, Chaudhuri, Hocquenghem (BCH) code, a turbo code, a Reed-Solomon code, a convolution code, a recursive systematic code (RSC), trellis-coded modulation (TCM), or block coded modulation (BCM), but the present disclosure is not limited thereto.

Figure 4A:
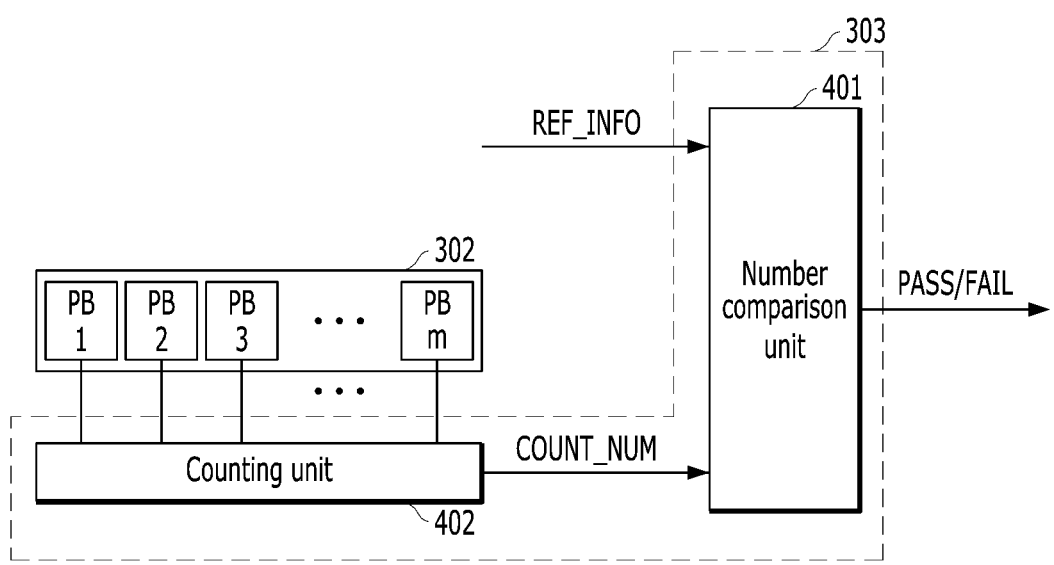
FIG. 4A is a diagram for describing an example of a construction of a check unit among components illustrated in FIG. 3 according to an embodiment of the present disclosure.

FIG. 4A is a diagram for describing an example of a construction of a check unit among the components of the memory device according to an embodiment of the present disclosure, which is illustrated in FIG. 3.

First, as described with reference to FIG. 3, the check unit 303 may use a method of checking whether each of selected bit lines has the program pass/fail state based on the potential level of each of the selected bit lines, counting the number of bit lines checked to have the program fail state, and comparing the number of bit lines that has been counted with the reference number REF_INFO applied by the control operation unit 304, in a verification interval included in a read operation or a program operation. In accordance with such an operating method, the check unit 303 may include the components disclosed in FIG. 4A.

Referring to FIG. 4A, the check unit 303 may include a counting unit 402 and a number comparison unit 401.

The counting unit 402 may count the number of bit lines the potential levels of which have been adjusted to a potential level having the program fail state among bit lines selected by the page buffer unit 302. For example, in a verification interval included in a read operation or a program operation, when the page buffer unit 302 operates by selecting bit lines corresponding to the cells in the first cell group, the counting unit 402 may count the number of bit lines the potential levels of which have been adjusted to a potential level having the program fail state among the bit lines corresponding to the cells in the first cell group, and may output, as the counting number COUNT_NUM, the number of bit lines that has been counted. Furthermore, in a verification interval included in a read operation or a program operation, when the page buffer unit 302 operates by selecting bit lines corresponding to the cells in the second cell group, the counting unit 402 may count the number of bit lines the potential levels of which have been adjusted to a potential level having the program fail state among the bit lines corresponding to the cells in the second cell group, and may output, as the counting number COUNT_NUM, the number of bit lines that has been counted. Furthermore, in a verification interval included in a read operation or a program operation, when the page buffer unit 302 operates by selecting bit lines corresponding to the cells in the third cell group, the counting unit 402 may count the number of bit lines the potential levels of which have been adjusted to a potential level having the program fail state among the bit lines corresponding to the cells in the third cell group, and may output, as the counting number COUNT_NUM, the number of bit lines that has been counted.

The number comparison unit 401 may compare a value of the counting number COUNT_NUM that has been output by the counting unit 402 with a value of the reference number REF_INFO applied by the control operation unit 304 may generate the pass signal PASS or the fail signal FAIL based on a result of the comparison, and may output the pass signal PASS or the fail signal FAIL to the control operation unit 304. For example, when a value of the counting number COUNT_NUM is less than a value of the reference number REF_INFO, the number comparison unit 401 may generate the pass signal PASS and output the pass signal PASS to the control operation unit 304. In contrast, when a value of the counting number COUNT_NUM is greater than or equal to a value of the reference number REF_INFO, the number comparison unit 401 may generate the fail signal FAIL and output the fail signal FAIL to the control operation unit 304.

Figure 4B:
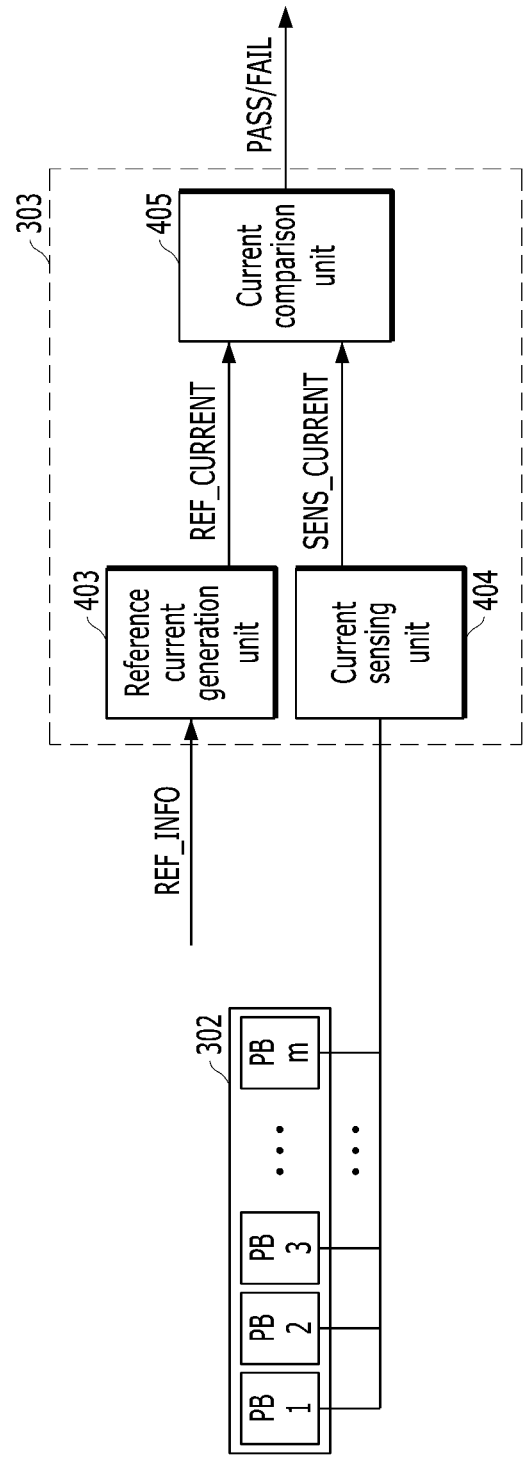
FIG. 4B is a diagram for describing another example of a construction of the check unit according to an embodiment of the present disclosure.

FIG. 4B is a diagram for describing another example of a construction of the check unit among the components of the memory device according to an embodiment of the present disclosure, which is illustrated in FIG. 3.

First, as described with reference to FIG. 3, the check unit 303 may use a method of checking whether each of selected bit lines has the program pass/fail state based on the potential level of each of the selected bit lines and comparing the amount of current according to the number of bit lines checked to have the program fail state and the reference current corresponding to the reference number REF_INFO applied by the control operation unit 304, in a read operation or a program operation. In accordance with such an operating method, the check unit 303 may include components disclosed in FIG. 4B.

Referring to FIG. 4B, the check unit 303 may include a reference current generation unit 403, a current sensing unit 404, and a current comparison unit 405.

The reference current generation unit 403 may adjust the size of a reference current REF_CURRENT that is generated based on a value of the reference number REF_INFO that has been received from the control operation unit 304.

The current sensing unit 404 may adjust the size of a sensing current SENS_CURRENT that is output based on the number of bit lines the potential levels of which have been adjusted to a potential level having the program fail state among bit lines selected by the page buffer unit 302. For example, in a verification interval included in a read operation or a program operation, when the page buffer unit 302 operates by selecting bit lines corresponding to the cells in the first cell group, the current sensing unit 404 may adjust the size of the sensing current SENS_CURRENT that is generated based on the number of bit lines the potential levels of which have been adjusted to a potential level having the program fail state among the bit lines corresponding to the cells in the first cell group. Furthermore, in a verification interval included in a read operation or a program operation, when the page buffer unit 302 operates by selecting bit lines corresponding to the cells in the second cell group, the current sensing unit 404 may adjust the size of the sensing current SENS_CURRENT that is generated based on the number of bit lines the potential levels of which have been adjusted to a potential level having the program fail state among the bit lines corresponding to the cells in the second cell group. Furthermore, in a verification interval included in a read operation or a program operation, when the page buffer unit 302 operates by selecting bit lines corresponding to the cells in the third cell group, the current sensing unit 404 may adjust the size of the sensing current SENS_CURRENT that is generated based on the number of bit lines the potential levels of which have been adjusted to a potential level having the program fail state among the bit lines corresponding to the cells in the third cell group.

The current comparison unit 405 may compare a value of sensing current SENS_CURRENT that has been output by the current sensing unit 404 with a value of the reference current REF_CURRENT that has been generated by the reference current generation unit 403 in accordance with the reference number REF_INFO applied by the control operation unit 304 may generate the pass signal PASS or the fail signal FAIL based on a result of the comparison, and may output the pass signal PASS or the fail signal FAIL to the control operation unit 304. For example, when a value of sensing current SENS_CURRENT is less than a value of the reference current REF_CURRENT, the current comparison unit 405 may generate the pass signal PASS and output the pass signal PASS to the control operation unit 304. In contrast, when a value of sensing current SENS_CURRENT is greater than or equal to a value of the reference current REF_CURRENT, the current comparison unit 405 may generate the fail signal FAIL and output the fail signal FAIL to the control operation unit 304.

Figure 5:
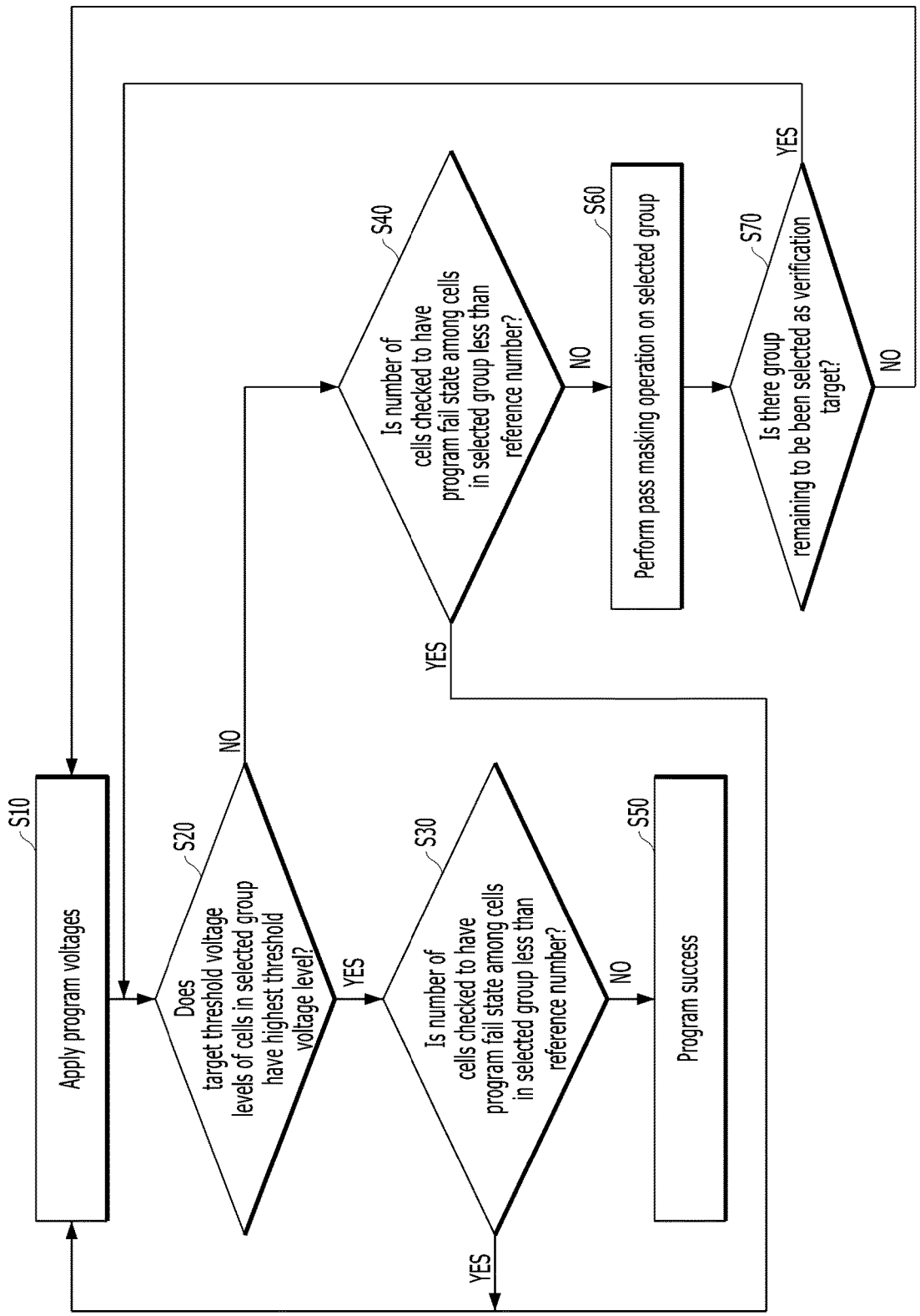
FIG. 5 is a flowchart for describing an operation of the memory device according to an embodiment of the present disclosure.

FIG. 5 is a flowchart for describing an operation of the memory device according to an embodiment of the present disclosure.

Referring to FIG. 5 along with FIG. 1, a program operation may include the multiple program loops PL1 to PL7. Furthermore, each of the multiple program loops PL1 to PL7 may include a program voltage application interval S10 in which the program voltages PGM1 to PGM7 are applied and a verification interval S20, S30, S40, S50, S60, and S70 in which whether a memory cell has been programmed by applying the verification voltages V1, V2, and V3.

Specifically, in the program voltage application interval S10, the program voltages PGM1 to PGM7 may be applied to a selected word line connected to a memory cell selected as a program target. Accordingly, the selected memory cell may be programmed to have one of multiple program states.

In the verification interval S20, S30, S40, S50, S60, and S70, a program verification operation for at least one of the multiple program states may be performed. For example, if each of multiple memory cells is divided into four program states on the basis of three threshold voltage levels, cells selected as a verification target among the multiple memory cells may be divided into three cell groups corresponding to the three threshold voltage levels.

In the verification interval S20, S30, S40, S50, S60, and S70, first, whether the target threshold voltage levels of cells in a selected group among the three cell groups have the highest threshold voltage level may be checked (S20).

If it is checked that the target threshold voltage levels of the cells in the selected group have the highest threshold voltage level in S20 (YES in S20), whether the number of cells checked to have the program fail state among the cells in the selected group is less than a reference number may be checked (S30).

If it is checked that the number of cells checked to have the program fail state among the cells in the selected group is less than the reference number in S30, the program operation may be determined to be a success (S50). That is, when the number of cells checked to have the program fail state among the cells in the selected group is less than the reference number in S30, it may be determined that the program operation has succeeded in the state in which a pass masking operation may not be performed on the selected group.

When the number of cells checked to have the program fail state among the cells in the selected group is the reference number or more in S30, the program voltage application interval S10 and the verification interval S20, S30, S40, S50, S60, and S70 may be performed again.

If it is checked that the target threshold voltage levels of the cells in the selected group do not have the highest threshold voltage level in S20 (NO in S20), whether the number of cells checked to have the program fail state among the cells in the selected group is less than the reference number may be checked (S40).

When the number of cells checked to have the program fail state among the cells in the selected group is less than the reference number in S40, a pass masking operation may be performed on the selected group (S60). The state of all of the cells in the selected group may become the program pass state through the operation S60.

After S60, whether there is a group remaining to be selected as a verification target is present may be checked (S70).

If there is a group remaining to be selected as a verification target is present in S70 (YES in S70), after a verification target group is newly selected, the operation S20 may be performed on the selected group again.

If there is no group remaining to be selected as a verification target is not present in S70 (NO in S70), the program voltage application interval S10 and the verification interval S20, S30, S40, S50, S60, and S70 may be performed again.

Although various embodiments have been described for illustrative purposes, it will be apparent to those skilled in the art that various changes and modifications may be made without departing from the spirit and scope of the invention as defined in the following claims. Furthermore, the embodiments may be combined to form additional embodiments.

What is claimed is:

1. A memory device comprising:
   a memory cell array including multiple memory cells connected between multiple word lines and multiple bit lines and have program states divided on a basis of N threshold voltage levels; and
   a controller configured to:
   divide, into N groups corresponding to the N threshold voltage levels, cells selected as a verification target, and
   perform, if a selected group of the N groups corresponds to remaining threshold voltage levels except a highest threshold voltage level among the N threshold voltage levels, a pass masking operation of determining the selected group to have a program pass state when a number of cells checked to have a program fail state in the selected group is less than a reference number in a verification interval included in a program operation,
   wherein the controller is configured not to perform, if the selected group corresponds to the highest threshold voltage level, the pass masking operation on the selected group in the verification interval.

2. The memory device of claim 1, wherein the controller comprises:
   a control circuit unit configured to:
   repeatedly perform a program loop comprising a program voltage application interval and the verification interval on a word line selected as a program target among the multiple word lines until a program operation succeeds, and
   check, in the verification interval, whether the number of cells checked to have the program fail state among the cells in the selected group is less than the reference number; and
   a control operation unit configured to:
   control, if the selected group corresponds to the highest threshold voltage level, the control circuit unit not to perform the pass masking operation even when the number of cells checked to have the program fail state among the cells in the selected group is less than the reference number, and
   determine the program operation to be a success.

3. The memory device of claim 2, wherein the control operation unit is configured to control the control circuit unit to perform the pass masking operation on the selected group when the number of cells checked to have the program fail state among the cells in the selected group is less than the reference number in the verification interval.

4. The memory device of claim 3, wherein the control circuit unit is configured to:
   set, as a program inhibition potential level, potential levels of all bit lines connected to the cells in the selected group during the pass making operation, and
   perform a subsequent program loop.

5. The memory device of claim 3, wherein the control circuit unit is configured to:
   set, as a program inhibition potential level, a potential level of a bit line connected to a cell checked to have the program pass state among the cells in the selected group when the number of cells checked to have the program fail state among the cells in the selected group is the reference number or more in the verification interval, and perform a subsequent program loop.

6. The memory device of claim 3, wherein the control operation unit is configured to:
   set, as the reference number, a number of correctable errors based on the number of cells in the selected group and
   transfer the reference number to the control circuit unit.

7. The memory device of claim 6, wherein the control circuit unit comprises:
   a page buffer unit comprising multiple page buffers connected to the multiple bit lines and configured to adjust potential levels of selected bit lines connected to the cells in the selected group based on a program state of the cells in the selected group in the verification interval; and
   a check unit connected to the page buffer unit and configured to:
   check whether each of the cells in the selected group has the program pass/fail state by sensing the potential level of each of the selected bit lines in the verification interval,
   count the number of cells checked to have the program fail state,
   compare the number of counted cells with the reference number applied by the control operation unit, and
   output a result of the comparison.

8. The memory device of claim 7, wherein the control operation unit is configured to:
   control, if the selected group corresponds to the remaining threshold voltage levels, the page buffer unit to perform the pass masking operation when the number of cells checked to have the program fail state is less than the reference number, and
   control, if the selected group corresponds to the highest threshold voltage level, the page buffer unit not to perform the pass masking operation when the number of cells checked to have the program fail state is less than the reference number.

9. The memory device of claim 6, wherein the control circuit unit comprises:
   a page buffer unit comprising multiple page buffers connected to the multiple bit lines and configured to adjust potential levels of selected bit lines connected to the cells in the selected group based on a program state of the cells in the selected group in the verification interval; and
   a check unit connected to the page buffer unit and configured to:
   check, in the verification interval, whether the cells in the selected group have the program pass/fail state by comparing, with a reference current corresponding to the reference number, an amount of current according to the potential level of each of the selected bit lines.

10. The memory device of claim 9, wherein the control operation unit is configured to:
    control, if the selected group corresponds to the remaining threshold voltage levels, the page buffer unit to perform the pass masking operation when the check unit checks that the cells in the selected group have the program pass state, and
    control, if the selected group corresponds to the highest threshold voltage level, the page buffer unit not to perform the pass masking operation when the check unit checks that the cells in the selected group have the program fail state.

11. An operating method of a memory device, comprising:
    an operation of repeatedly performing, until a program operation succeeds, a program loop on a memory cell selected as a program target among multiple memory cells connected between multiple word lines and multiple bit lines, the program loop including a program voltage application interval and a verification interval;
    a first check operation of dividing the cells selected as a verification target into N groups corresponding to N threshold voltage levels and checking, in the verification interval, whether a selected group of the N groups corresponds to remaining threshold voltage levels except a highest threshold voltage level among the N threshold voltage levels;
    a second check operation of checking a number of cells checked to have a program fail state among the cells in the selected group is less than a reference number;
    a first determination operation of performing a pass masking operation of determining the selected group to have a program pass state, when the selected group corresponds to the remaining groups in the first check operation and the number of cells checked to have the program fail state is less than the reference number in the second check operation; and
    a second determination operation of determining the program operation to be a success without performing the pass masking operation when the selected group corresponds to the highest threshold voltage level in the first check operation and the number of cells checked to have the program fail state is less than the reference number in the second check operation.

12. The operating method of claim 11, wherein the pass masking operation includes an operation of setting, as a program inhibition potential level, potential levels of all bit lines connected to the cells in the selected group.

13. The operating method of claim 12, further comprising an operation of setting, as the program inhibition potential level, a potential level of a bit line connected to a cell checked to have the program pass state among the cells in the selected group when the number of cells checked to have the program fail state is the reference number or more in the second check operation.

14. The operating method of claim 13, wherein the reference number is set as a number of correctable errors based on the number of cells in the selected group.

15. The operating method of claim 14, wherein the second check operation comprises:
    checking whether each of the cells in the selected group has the program pass/fail state by checking whether a threshold voltage level of each of the cells in the selected group is a target voltage level or more;
    counting the number of cells checked to have the program fail state; and
    comparing the number of counted cells with the reference number.

16. The operating method of claim 14, wherein the second check operation comprises:
    checking whether each of the cells in the selected group has the program pass/fail state by checking whether a threshold voltage level of each of the cells in the selected group is a target voltage level or more; and comparing, with a reference current corresponding to the reference number, an amount of current according to the number of cells checked to have the program fail state.

17. A memory device comprising:
a row of memory cells; and
a control circuit configured to perform a program operation on the row by:
verifying the program operation on partial memory cells in the row according to a pass masking scheme, the pass masking scheme including determining the partial memory cells to have a program pass state when a number of cells checked to have a program fail state in the partial memory cells is less than a reference number in a verification interval included in a program operation; and
verifying remaining memory cells in the row without the pass masking scheme.

18. The memory device of claim 17, wherein the remaining memory cells correspond to a highest one of target threshold voltages for the row.

* * * * *